United States Patent [19]
Morris et al.

[11] Patent Number: 5,785,851
[45] Date of Patent: Jul. 28, 1998

[54] HIGH CAPACITY FILTER

[75] Inventors: Jay M. Morris, Cuba; Laurie A. Strom, Geneseo, both of N.Y.

[73] Assignee: Vesuvius Crucible Company, Wilmington, Del.

[21] Appl. No.: 702,790

[22] Filed: Aug. 23, 1996

[51] Int. Cl.⁶ .................................................. B01D 39/20
[52] U.S. Cl. .................. 210/489; 210/490; 210/494.1; 210/510.1; 29/25.01; 55/523; 55/DIG. 30
[58] Field of Search .................. 29/25.01; 55/523, 55/DIG. 30; 210/510.1, 488, 489, 490, 494.1, 499

[56] References Cited

U.S. PATENT DOCUMENTS

| | | | |
|---|---|---|---|
| 4,251,239 | 2/1981 | Clyde et al. | 55/132 |
| 4,568,595 | 2/1986 | Morris | 428/116 |
| 4,713,180 | 12/1987 | Hofmann et al. | 55/487 |
| 4,765,833 | 8/1988 | Narumiya et al. | 210/510.1 |
| 5,104,540 | 4/1992 | Day et al. | 210/510.1 |
| 5,110,470 | 5/1992 | Yokosawa et al. | 210/506 |
| 5,190,897 | 3/1993 | Azumi | 210/510.1 |
| 5,227,342 | 7/1993 | Anderson et al. | 210/510.1 |
| 5,238,571 | 8/1993 | Menk | 210/510.1 |
| 5,336,295 | 8/1994 | DeYoung et al. | 210/510.1 |
| 5,558,760 | 9/1996 | Sekhar | 55/523 |

FOREIGN PATENT DOCUMENTS 1019807  2/1966  United Kingdom.

*Primary Examiner*—W. L. Walker
*Attorney, Agent, or Firm*—Webb Ziesenheim Bruening Logsdon Orkin & Hanson, P.C.

[57] ABSTRACT

A reticulated ceramic filter for molten metal has an inlet portion with an inlet surface, an intermediate body portion contiguous with the inlet portion and an outlet portion with an outlet surface. The inlet surface is non-planar with upper surfaces and lower surfaces to provide a substantial contact area for molten metal supplied to the inlet surface.

52 Claims, 5 Drawing Sheets

HIGH CAPACITY FILTER

This invention relates generally to filters for removing solid particulates from liquids such as molten metal and more particularly to reticulated ceramic filters having geometries that provide a non-planar inlet surface with a substantial area which permits a high flow rate through a filter for removing solid inclusions and impurities from molten metal.

BACKGROUND OF THE INVENTION

1. Field of the Invention

The invention is a reticulated ceramic filter made from a sintered ceramic foam. The reticulated ceramic comprises a two-phase system wherein a continuous solid phase is interspersed in a continuous pore phase extending in all directions throughout the ceramic. The solid phase is made from relatively inert high temperature resistant inorganic ceramic materials which are oxides, carbides or the like. Early methods of producing reticulated ceramics are disclosed in U.S. Pat. No. 3,090,094 to Schwartzwalder et al. and in British Patent No. 916,784.

It is desirable to utilize ceramic oxide materials which are relatively inert to corrosive environments at elevated temperatures and are not affected by rapid changes in temperature while retaining good strength and structural integrity. Sintered refractories may be used in the formation of the ceramic filters according to the invention. The refractories generally have high strength at elevated temperatures and are resistant to both corrosion and erosion by molten metals.

2. Related Prior Art

U.S. Pat. No. 4,568,595 entitled "Coated Ceramic Structure and Method of Making Same" (hereinafter the '595 patent) discloses reticulated ceramics for use as filters. Methods of manufacturing the reticulated ceramics and the physical properties of certain reticulated ceramics are set forth in the '595 patent. The disclosures of the '595 patent are incorporated herein by reference.

SUMMARY OF THE INVENTION

The high capacity filters of the invention have a relatively large inlet surface area for initial contact with molten metal supplied to the filter compared to prior art filters. This permits an increase in the flow rate of the metal and an increase in the ceroxide collection capacity of the filter before the filter plugs up with removed inclusions. The filter has a non-planar inlet surface which may be formed by undulations to increase the area of the inlet surface of the filter. The geometry of the precursor material results in a reticulated ceramic filter having a commensurate geometry which provides an inlet surface having a large contact area which significantly increases the filtration capacity of the filter and the flow rate of molten metal passing through the filter. One desirable entrance face geometry is an egg carton or mogul configuration. Inlet surfaces having different acoustic absorption type configurations are also used. The important aspect of the inlet surface geometry is that it provides a substantial contact surface for exposure to molten metal entering the filter.

In one embodiment of the invention, at least one relatively coarse refractory screen prefilter is located at the inlet surface of a filter to increase the filtration capacity of the filter by removing relatively large solid inclusions and impurities from the molten metal before the molten metal contacts the inlet surface of the reticulated ceramic filter. The use of a refractory screen prefilter prevents clogging and plug off of the reticulated ceramic filter which can occur when non-metallic solid impurities or high viscosity slags and inclusions contact the inlet surface of the filter which can blind off the inlet surface. The use of more than one refractory screen prefilter at the inlet surface of a filter is also within the scope of the invention.

In a second embodiment of the invention, the inlet surface of the filter is formed with moguls and valleys, and the surfaces of the valleys may be blocked off or plugged with a coating of material having the same composition as the filter. This geometry will divert the direction of flow of molten metal so as to increase the tortuosity of the flow of molten metal prior to the passage of the molten metal into the filter by forcing some of the molten metal to change direction on the order of 90°. Such tortuous changes enhance the deposition of foreign matter from the molten metal onto the filter.

In another embodiment of the invention, the inlet surface of the filter is provided with a plurality of spaced blind holes. The bottom of each hole is blocked off or plugged with a coating of material having the same composition as the filter. This geometry diverts the flow of molten metal by approximately 90° through the side wall of the blind hole because the molten metal cannot flow out of the hole through the bottom. The filter may have layers with different porosities. Generally, the layer adjacent to the inlet surface will be the most porous and the layer adjacent to the outlet surface will be the least porous.

A further embodiment of the invention provides elongated tubular filters for use in conjunction with discharge nozzles of tundishes. The filters are formed with an inlet surface having a plurality of longitudinal undulations. The undulations may be formed on the outer circumferential surface of the filter or on the surface of a longitudinal axial passageway extending through the filter.

The advantages of the filters of the invention compared to the filters described in the aforementioned '595 patent include a substantial increase in the filtration capacity of the filters and an increase in the flow rate of molten metal passing through the filters. The unique geometries of the precursors used to form the filters of the invention result in filters having significantly increased inlet surface areas. The increased inlet surface areas of the filters permit substantially more molten metal to flow through the filters at a greater flow rate than is possible with the available commercial filters. A lower interstitial velocity can be maintained at the inlet surface while an increase in the overall metal flow rate is achieved.

The composition of the reticulated ceramic filter of the invention is basically the same as the reticulated ceramic portion of filters presently in use which includes but is not limited to zirconia partially stabilized with MgO as disclosed in the '595 patent. A 92% $Al_2O_3$ ceramic material may be used as well as other sinterable ceramics.

A high capacity reticulated ceramic filter with a coarse refractory screen prefilter located at the entrance face provides a prefilter arrangement having a high level of filtration. A plurality of refractory screen prefilters may be used, if desired.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
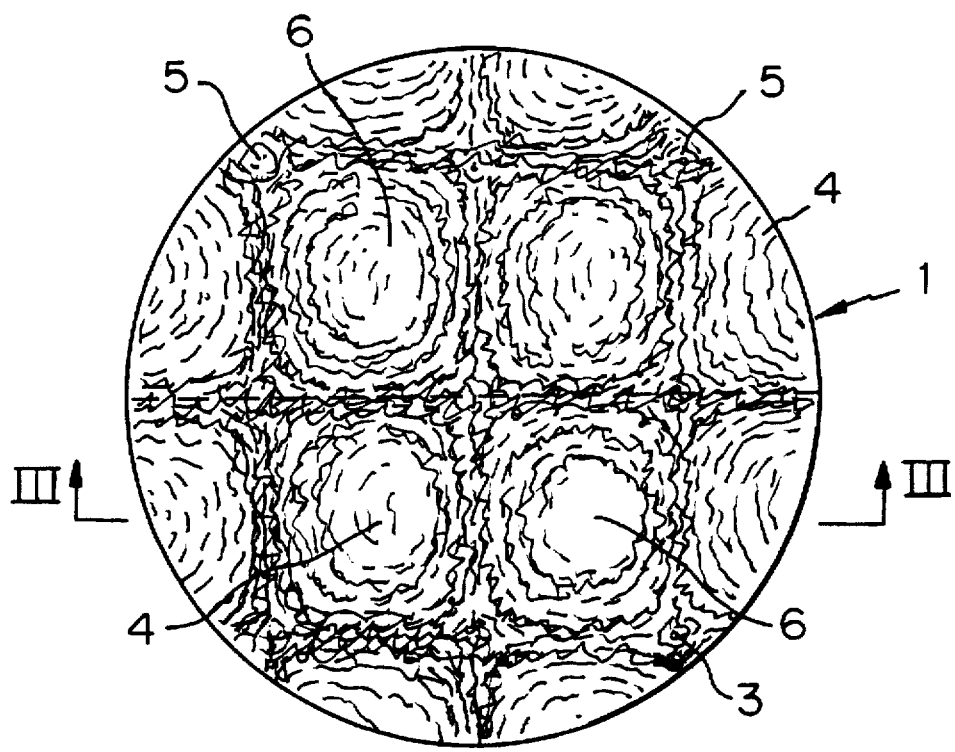
FIG. 1 is a plan of a high capacity filter having an undulating inlet surface.

For purposes of description herein, the terms "upper", "lower", "right", "left", "rear", "front", "vertical", "horizontal" and derivatives thereof relate to the invention as oriented in the drawing figures. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
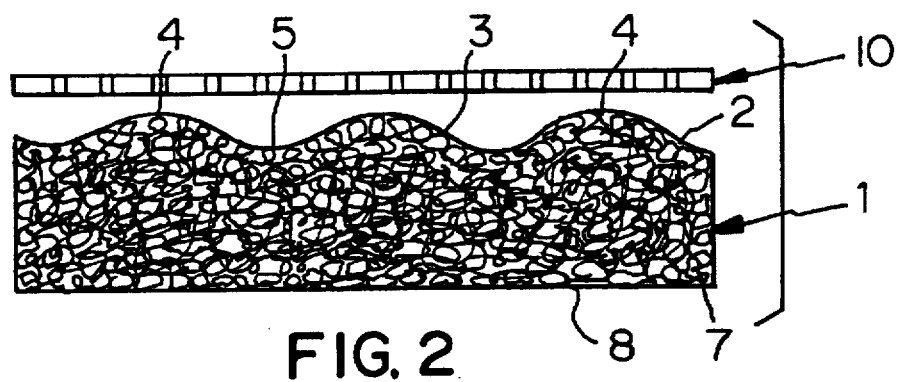
FIG. 2 is an elevation of the filter shown in FIG. 1 with a refractory screen prefilter above the inlet surface.
Figure 3:
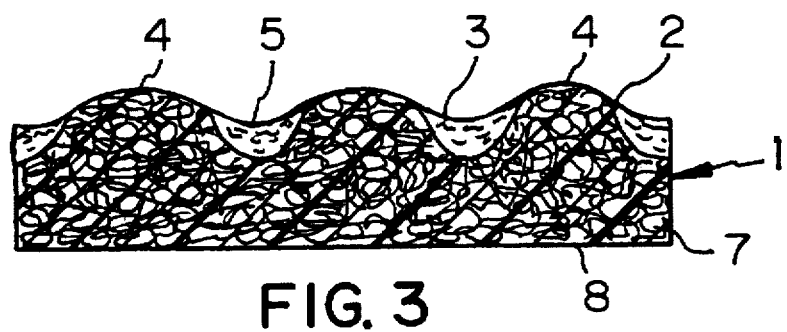
FIG. 3 is a section on line III—III of FIG. 1.

FIGS. 1-3 of the drawings show a reticulated ceramic filter disc 1 having an upper inlet portion 2 with an inlet surface 3 formed with an undulating or mogul-like geometry. The inlet surface 3 has raised peaks 4 with generally coplanar top surfaces 6 and lower depressions or valleys 5 surrounding the bases of the peaks. The filter 1 includes an intermediate body portion 7 adjacent to the upper inlet portion 2. The intermediate body portion is located next to a lower outlet portion having a substantially flat continuous outlet surface 8. The filter 1 may be used alone or a relatively coarse refractory screen prefilter 10 may be located adjacent to the top surfaces 6 of the peaks 4 of the inlet surface 3. The refractory screen prefilter 10 may be sintered to the top surfaces 6 of the peaks 4 on the inlet surface 3 of the filter 1, if desired, to form a unitary refractory filter structure or it may rest on the surfaces 6.

In one series of tests, molten steel was supplied to the inlet surface of a 4 inch outside diameter by 1 inch thick 10 ppi filter such as that shown in FIG. 1 of the drawings. Sixteen hundred pounds of molten steel passed through the filter at a flow rate of 5.5 lb/in$^2$/sec. This is approximately three times the typical capacity and twice the typical flow rate of molten steel passing through a 4 inch outside diameter by 1 inch thick 10 ppi reticulated ceramic filter as is disclosed in the '595 patent. The comparison shows that the typical capacity of the filter for filtering foundry grade carbon steel is on the order of 20 lb/in$^2$ of the filter inlet surface, whereas the capacity of a reticulated ceramic filter having an inlet surface with the geometry shown in FIG. 1 of the drawings is approximately 60 lb/in$^2$. Filter capacity has increased by a factor of 3 when using an undulating inlet surface compared with a flat inlet surface with molten metal subjected to the same melt practice. It is apparent that increasing the area of the inlet surface of the filter shown in FIG. 1 of the drawings by increasing the dimensions of the peaks and the depressions on the inlet surface will further increase the capacity to approximately 120 pounds of molten metal per square inch of filter area.

Figure 4:
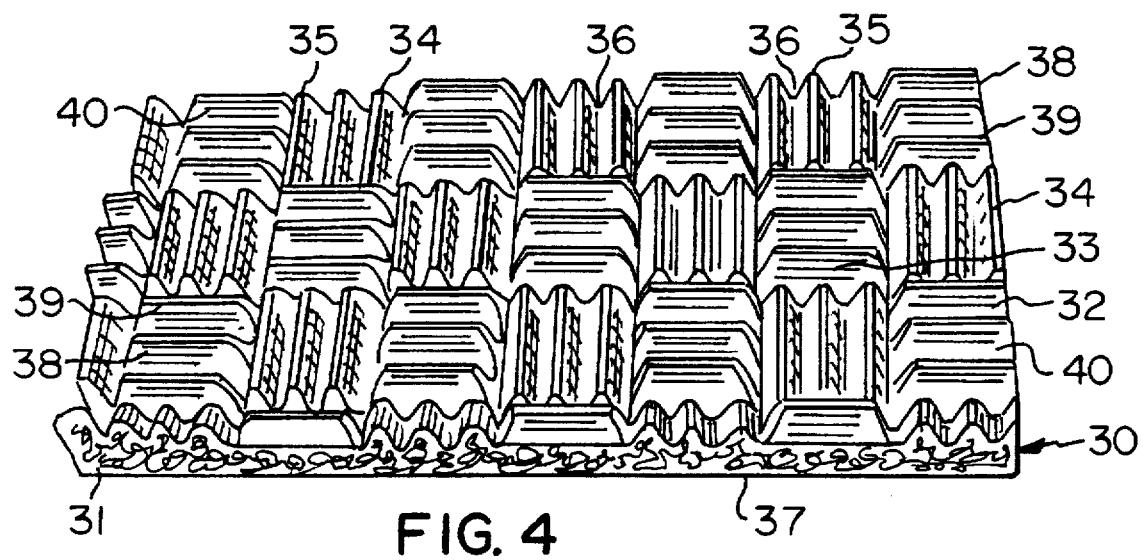
FIG. 4 is a perspective view of a high capacity filter having an inlet surface with an acoustic type geometry.
Figure 5:
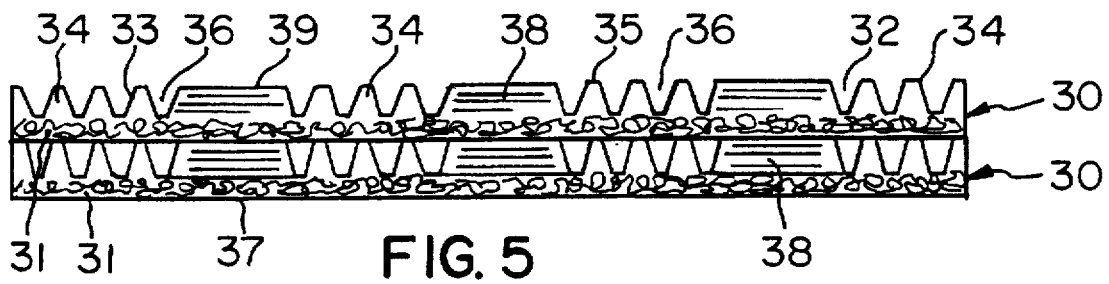
FIG. 5 is an elevation of two stacked filters shown in FIG. 4.

FIGS. 4 and 5 of the drawings show a second embodiment of the invention wherein the reticulated ceramic filter 30 has a lower body portion 31 and an upper portion 32 having an inlet surface 33 with an acoustic geometry. The acoustic geometry is present in a repetitive pattern having a plurality of substantially parallel members 34 with substantially parallel upper ridges 35 and substantially parallel lower valleys 36 located between the bases of adjacent members 34. Additional sets of substantially parallel members 38 having substantially parallel upper ridges 39 and substantially parallel lower valleys 40 located between the bases of adjacent members 38 are located perpendicular to the members 34 and the valleys 36. The reticulated ceramic filter 30 may be cut to size from a larger block of reticulated ceramic filter to provide a filter with the desired lateral dimensions.

As shown in FIG. 5 of the drawings, a plurality of reticulated ceramic filters 30 can be stacked with the lower surface 37 of the upper filter 30 resting on the ridges 35 and 39 of the members 34 and 38 of the lower filter 30. Additional filters will remove additional solid impurities and inclusions from the molten metal but will decrease the flow rate.

Figure 6:
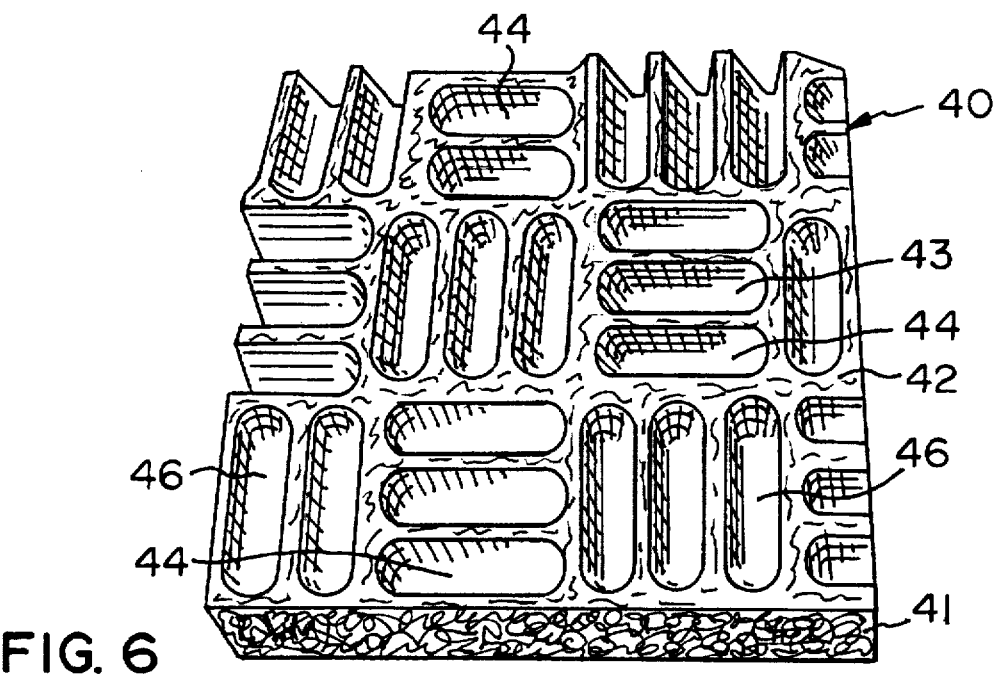
FIG. 6 is a perspective view of another embodiment of a high capacity filter having an inlet surface with an acoustic type geometry.

FIG. 6 of the drawings shows another embodiment of a reticulated ceramic filter having a lower body portion 41 and an upper portion 42 having an inlet surface 43 with an acoustic geometry. The geometry of the inlet surface 43 of the filter shown in FIG. 6 differs from the geometry of the inlet surface 33 of the filter shown in FIG. 4 of the drawings as is readily apparent from a comparison of the two drawing figures. The filter shown in FIG. 6 of the drawings has sets of substantially parallel elongated recesses 44 and sets of substantially parallel elongated recesses 46 arranged at a right angle to the recesses 44. The reticulated ceramic filter shown in FIG. 6 of the drawings is a female geometry in contrast to the male geometry of the reticulated ceramic filter shown in FIGS. 4 and 5 of the drawings.

Figure 7:
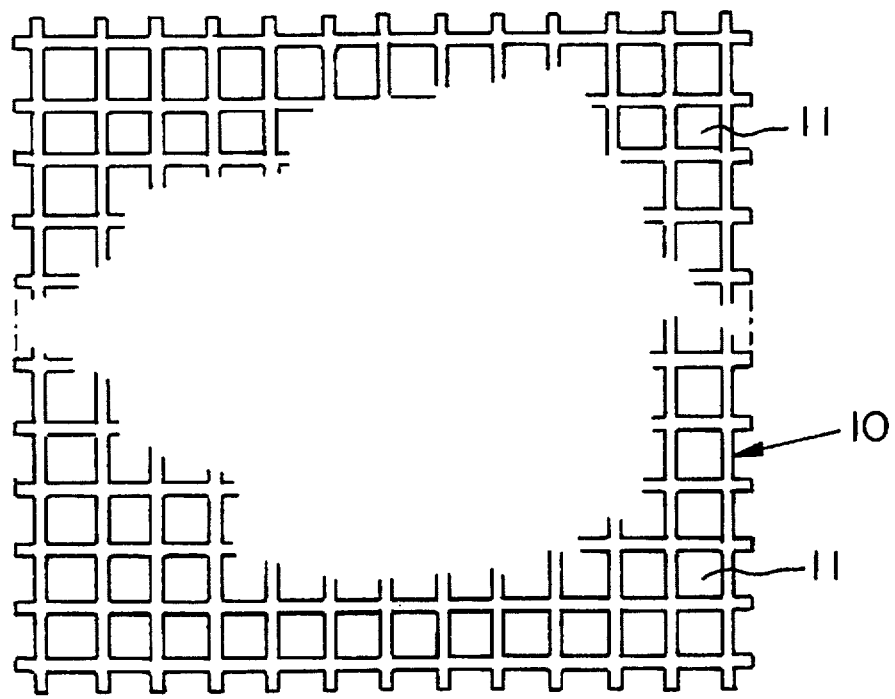
FIG. 7 is a broken plan of a refractory screen prefilter.

FIG. 7 of the drawings is a broken plan view of a coarse refractory screen prefilter for use at the inlet surface of a reticulated ceramic filter as shown in FIGS. 1, 4 and 6 of the drawings. The prefilter 10 is formed from a plastic mesh precursor such as the web material. The plastic mesh precursor is coated with a refractory material which is dried and fired to form the rigid refractory filter. As can be seen in FIG. 7 of the drawings, the prefilter 10 has a plurality of substantially rectangular through openings 11 to remove relatively large solids from liquid flowing through the prefilter.

Figure 8:
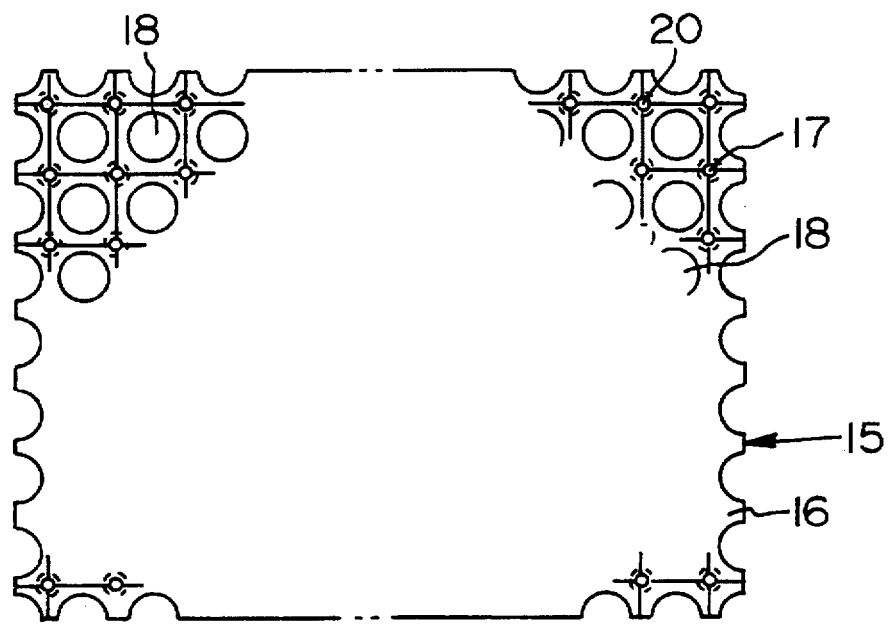
FIG. 8 is a broken plan view of another embodiment of a refractory screen prefilter.
Figure 9:
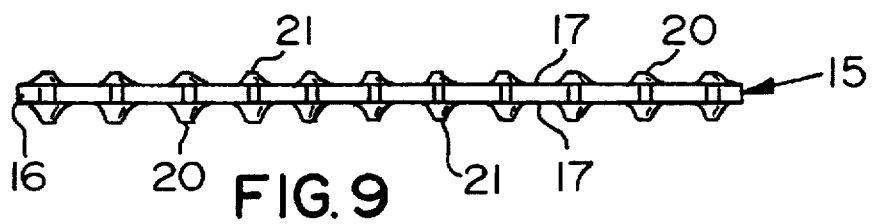
FIG. 9 is an elevation of the refractory screen prefilter shown in FIG. 8.

FIGS. 8 and 9 of the drawings show another embodiment of a refractory screen prefilter 15 which can be used at the inlet surface of the reticulated ceramic filters shown in FIGS. 1, 4 and 6 of the drawings. The prefilter 15 shown in FIGS. 8 and 9 has a base portion 16 with opposed surfaces 17 having a plurality of substantially cylindrical through openings 18 formed therein. Protrusions 20 extend away from the opposed surfaces 17 of the base portion 16. The protrusions are located between the openings 18 as best shown in FIG. 8 of the drawings and the distal surface 21 of each protrusion 20 is substantially coplanar with the distal surfaces of all of the other protrusions on that side of the base portion 16. The screen design shown in FIGS. 8 and 9 of the drawings permits a plurality of screens 15 to be stacked with the protrusions 20 on adjacent screens offset so that a tortuous path is created for a liquid flowing through the stack of screens. The tortuous path is created by the locations of the offset protrusions which contact the filters immediately adjacent thereto and the openings 18.

Figure 10:
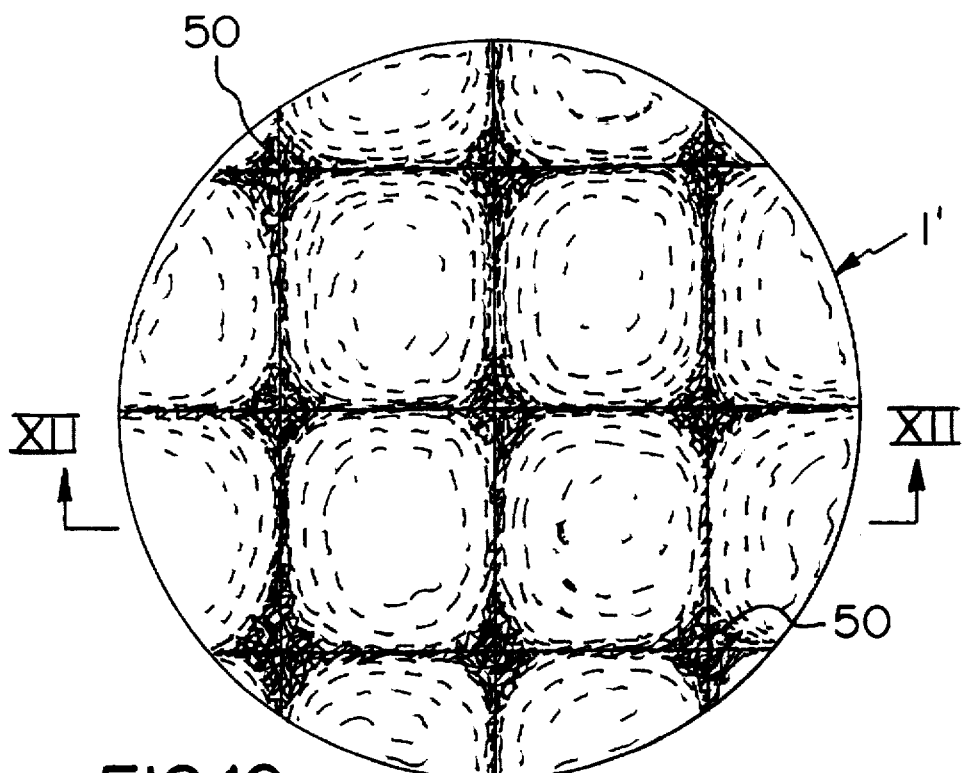
FIG. 10 is a plan of a high capacity filter having an undulating inlet surface with blocked valleys.
Figure 11:
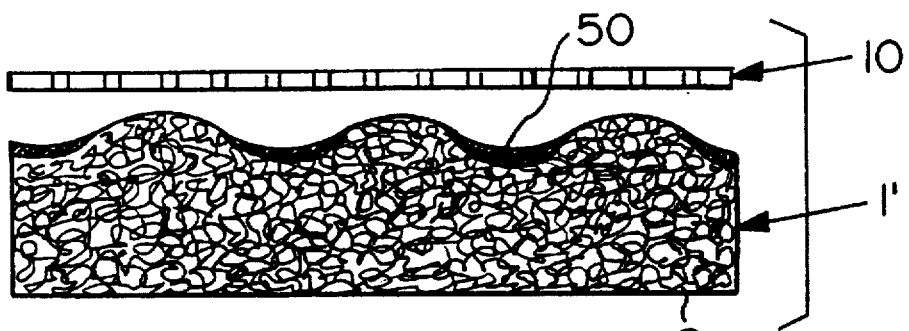
FIG. 11 is an elevation of the filter shown in FIG. 10 with a refractory screen prefilter above the inlet surface.
Figure 12:
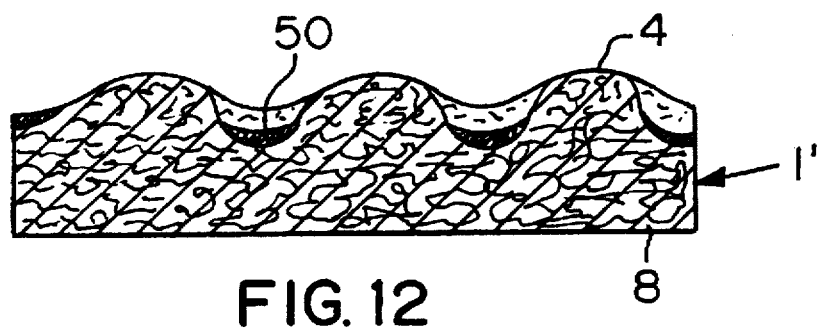
FIG. 12 is a section on line XII—XII of FIG. 10.

The embodiment of the invention shown in FIGS. 10–12 of the drawings is substantially the same as the embodiment shown in FIGS. 1–3 of the drawings except that the valleys or depressions surrounding the bases of the peaks 4 are blocked by a thin ceramic coating 50 of the same material as the filter which is relatively impervious to impede the flow of molten metal downwardly from the valleys into the filter. A thin ceramic coating suitable for this purpose is disclosed in the '595 patent. The blocking of the depressions or valleys changes the direction of the downwardly flowing molten metal by approximately 90° so that it follows a tortuous path as it passes into and through the filter and exits the lower outlet surface 8.

Figure 13:
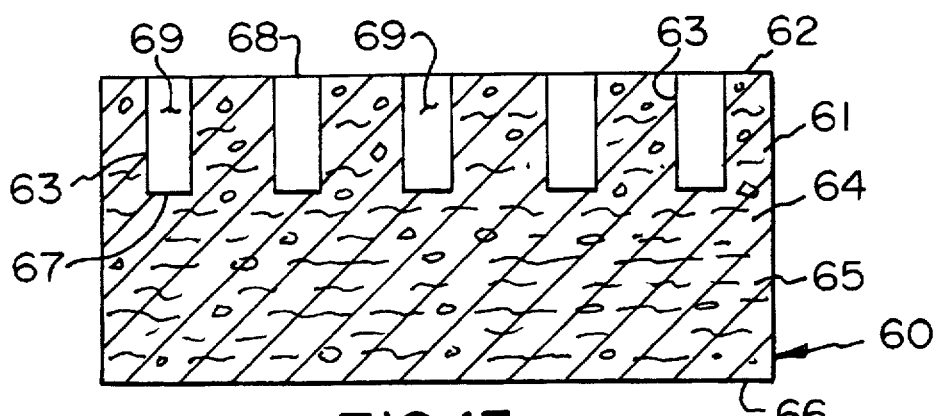
FIG. 13 is a section on line XIII—XIII of FIG. 14.
Figure 14:
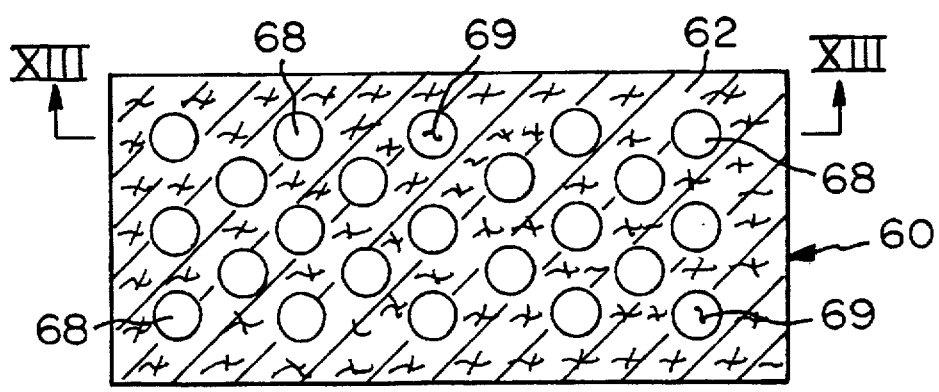
FIG. 14 is a plan view of a high capacity filter having a plurality of spaced blind holes formed therein.

The embodiment of the invention shown in FIGS. 13 and 14 of the drawings is a reticulated ceramic filter 60 having an upper body portion 61 with an inlet surface 62, an intermediate body portion 64 and a lower body portion 65 with an outlet surface 66. A plurality of openings 68 are formed in the inlet surface 62. A blind hole or depression 69 extends downwardly from each opening 68 into the upper body portion 61 and the intermediate body portion 64. Each blind hole or depression 69 has a cylindrical side wall 63 and terminates in a lower end 67. The end 67 is provided with a substantially impervious blocking layer of the same material as the filter as is disclosed for the coating in the '595 patent. The layer on the end 67 prevents the molten metal from flowing out of the hole 69 through the end 67. Since the molten metal cannot flow through the end 67 of the hole 69, it is forced to change direction and flow at substantially a right angle to the original direction of flow into the blind hole 69 and exit the blind hole through the cylindrical side wall 63. After the molten metal flows out of the hole, it proceeds through the intermediate portion 64 and the lower portion 65 of the filter and exits the filter through the outlet surface 66. The utilization of the substantially impervious coating on the bottom 67 of each blind hole 69 prevents funneling of the metal as it flows downwardly into the hole.

As will be appreciated by those skilled in the art, the filter shown in FIGS. 13 and 14 of the drawings may include an impervious coating on the entrance face 62 between the openings 68. Additionally, if desired, the filter can be formed of layers of reticulated ceramic material having progressively smaller pore sizes between the inlet surface 62 and the outlet surface 66. Thus, the filter may be divided into an upper section having 30 ppi pore size; an intermediate section having 40 ppi pore size; and a lower section immediately above the outlet surface having a 50–65 ppi pore size. This arrangement will maximize the removal of impurities while avoiding plugging of the filter.

Figure 15:
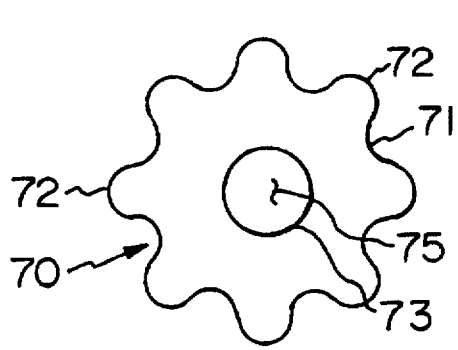
FIG. 15 is a plan view of a tubular filter having an outside surface formed with undulations.
Figure 16:
FIG. 16 is a broken elevation of the filter shown in FIG. 15.

FIGS. 15 and 16 of the drawings show a tubular filter 70 having an outer inlet surface 71 formed with a plurality of longitudinal undulations or lobes 72 in order to provide a large area for the molten metal which flows into the filter. This can also be achieved with a plurality of moguls or acoustic undulations formed on the outside diameter of the tubular filter. The molten metal flows through the filter inlet surface 73 into the central outlet passage 75. The filter shown in FIGS. 15 and 16 is used in a tundish and is formed from a reticulated ceramic material. The upper end will be held in place by a dense ceramic so that the molten metal cannot flow directly into the central passageway 75.

Figure 17:
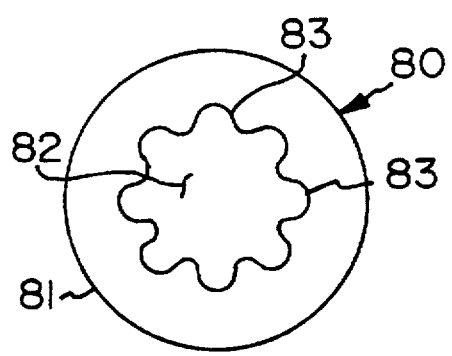
FIG. 17 is a plan view of a tubular filter having an inside diameter with an undulating surface.
Figure 18:
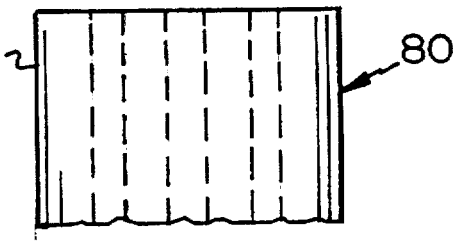
FIG. 18 is a broken elevation of the filter shown in FIG. 17.

FIGS. 17 and 18 of the drawings show a reticulated ceramic tubular filter 80 through which molten metal flows from the inside out. The filter 80 has a cylindrical continuous outer surface 81 which is the outlet surface. An axial longitudinal passage 82 extends through the filter and is formed with a plurality of undulations or lobes 83 extending around the surface of the passage 82. The molten metal flows downwardly through the central opening and outwardly through the outlet surface 81 of the filter. The filter shown in FIGS. 17 and 18 is also inserted into a tundish nozzle for discharging molten metal from the tundish.

The tubular filters 70 and 80 shown in FIGS. 15–18 of the drawings are resistant to plugging which is advantageous when used in a high volume tundish. The filters can have a nominal length of 6 inch with a 6 inch outer diameter and a 3 inch inner diameter axial longitudinal passageway although, as will be appreciated by those skilled in the art, the dimensions are not critical to the successful function of the filter in cleaning molten metal from a tundish.

In the foregoing description, it will be readily appreciated by those skilled in the art that modifications may be made to the invention without departing from the concepts disclosed herein. Such modifications are to be considered as included within the following claims, unless the claims by their language expressly state otherwise. Accordingly, the particular embodiments are illustrative only and are not limiting as to the scope of the invention which is to be given the full breadth of the appended claims and any and all equivalents thereof.

We claim:

1. A filter having a reticulated ceramic inlet portion, a reticulated ceramic intermediate body portion contiguous with said inlet portion and a reticulated ceramic outlet portion contiguous with said intermediate body portion; said inlet portion having an inlet surface formed with a plurality of raised peaks, each of said raised peaks having an upper surface and a base, a lower depression located at said base of each of said raised peaks; and said outlet portion having an outlet surface spaced from said intermediate body portion, whereby said raised peaks and said lower depressions of said inlet surface provide a substantial contact area for liquids supplied to said inlet surface of said inlet portion of said filter to increase the filtration capacity of said filter and the rate of flow of liquid passing through said inlet portion, said intermediate body portion and said outlet portion to said outlet surface.

2. A filter as set forth in claim 1 wherein each of said inlet portion, said intermediate body portion and said outlet portion has a different porosity.

3. A filter as set forth in claim 2 wherein said porosity is progressively greater between said inlet surface and said outlet surface.

4. A filter as set forth in claim 1 including a refractory screen prefilter located adjacent to said inlet surface of said inlet portion to remove solid inclusions from liquids passing through said refractory screen prefilter to decrease clogging of said inlet portion and said intermediate body portion.

5. A filter as set forth in claim 2 wherein said refractory screen prefilter is sintered to said upper surfaces of said raised peaks on said inlet surface of said inlet portion.

6. A filter as set forth in claim 1 wherein said upper surface of each of said plurality of raised peaks on said inlet surface has a rounded configuration and said rounded upper surfaces of said raised peaks are substantially coplanar, whereby said inlet surface of said inlet portion has an undulating configuration.

7. A filter as set forth in claim 6 wherein each of said inlet portion, said intermediate body portion and said outlet portion has a different porosity.

8. A filter as set forth in claim 7 wherein said porosity is progressively greater between said inlet surface and said outlet surface.

9. A filter as set forth in claim 6 including a refractory screen prefilter sintered to said rounded upper surfaces of said raised peaks, whereby said refractory screen removes solid inclusions from liquid passing through said refractory prefilter to decrease clogging of said filter.

10. A filter as set forth in claim 1 wherein said plurality of raised peaks on said inlet portion is a first group of spaced substantially parallel peaks having upper ridges and said lower depressions are substantially parallel with said spaced substantially parallel peaks in said first group of peaks and a second group of spaced substantially parallel peaks having upper ridges and a lower depression substantially parallel with each of said peaks in said second group of peaks, whereby said peaks and said depressions in said first group are arranged at substantially a right angle relationship with said peaks and said depressions in said second group of peaks and depressions to form said inlet surface on said inlet portion with an acoustic absorption configuration, and said substantially right angle relationship between said first and second groups being repeated on said inlet surface of said inlet portion to form a pattern of groups of peaks at substantially a right angle relationship.

11. A filter as set forth in claim 4 wherein said refractory screen prefilter is formed with a plurality of substantially rectangular shaped openings.

12. A filter as set forth in claim 11 wherein said refractory screen prefilter is sintered to said upper surfaces of said raised peaks on said inlet surface.

13. A filter as set forth in claim 4 wherein said refractory screen prefilter has a base portion having a finite thickness and opposed substantially parallel surfaces, a plurality of through holes formed in said base portion and protrusions extending outwardly from said opposed surfaces of said base portion.

14. A filter as set forth in claim 13 wherein each of said protrusions is located between through openings in said base portion and each of said protrusions has a distal surface.

15. A filter as set forth in claim 14 wherein said distal surfaces of said protrusions are sintered to said upper surfaces of said raised peaks on said inlet surface of said inlet portion.

16. A filter as set forth in claim 4 including a plurality of refractory screen prefilters located adjacent to said inlet surface of said inlet portion, whereby a tortuous path is created for liquid flowing through said plurality of refractory screen prefilters.

17. A filter having a reticulated ceramic inlet portion, a reticulated ceramic intermediate body portion contiguous with said inlet portion and a reticulated ceramic outlet portion contiguous with said intermediate body portion; said inlet portion having an inlet surface formed with a plurality of raised peaks, each of said raised peaks having an upper surface and a base, a lower depression located at said base of each of said raised peaks, an impervious ceramic coating on each of said lower depressions to divert the direction of flow of liquid flowing into said depressions into a different direction of flow, and said outlet portion having an outlet surface spaced from said intermediate body portion, whereby said coated depressions form a tortuous flow path for liquid supplied to said inlet surface and said raised peaks and said lower depressions of said inlet surface provide a substantial contact area for liquid supplied to said inlet surface of said inlet portion of said filter to increase the filtration capacity of said filter and the rate of flow of liquid passing through said filter.

18. A filter as set forth in claim 17 wherein each of said inlet portion, said intermediate body portion and said outlet portion has a different porosity.

19. A filter as set forth in claim 18 wherein said porosity is progressively greater between said inlet surface and said outlet surface.

20. A filter as set forth in claim 17 including a refractory screen prefilter located adjacent to said inlet surface of said inlet portion of said filter to remove solid inclusions from liquids passing through said refractory screen prefilter to decrease clogging of said inlet portion and said body portion of said filter.

21. A filter as set forth in claim 20 wherein said refractory screen prefilter is sintered to said upper surfaces of said raised peaks on said inlet surface of said inlet portion.

22. A filter as set forth in claim 17 wherein said upper surface of each of said plurality of raised peaks on said inlet portion has a rounded configuration and said rounded upper surfaces of said raised peaks are substantially coplanar, whereby said inlet surface of said inlet portion has an undulating configuration.

23. A filter as set forth in claim 22 wherein each of said inlet portion, said intermediate body portion and said outlet portion has a different porosity.

24. A filter as set forth in claim 23 wherein said porosity is progressively greater between said inlet surface and said outlet surface.

25. A filter as set forth in claim 22 including a refractory screen prefilter sintered to said rounded upper surfaces of said raised peaks, whereby said refractory screen prefilter removes solid inclusions from liquid passing through said refractory screen prefilter to decrease clogging of said filter.

26. A filter as set forth in claim 17 wherein said plurality of raised peaks on said inlet surface is a first group of spaced substantially parallel peaks having upper ridges and said lower depressions are substantially parallel with said spaced substantially parallel peaks in said first group of peaks and a second group of spaced substantially parallel peaks having upper ridges and a lower depression substantially parallel with each of said peaks in said second group of peaks, whereby said peaks and said depressions in said first group are arranged at substantially a right angle relationship with said peaks and said depressions in said second group of peaks and depressions to form said inlet surface on said inlet portion with an acoustic absorption configuration, and said substantially right angle relationship between said first and second groups being repeated on said inlet surface of said inlet portion.

27. A filter as set forth in claim 20 wherein said refractory screen prefilter has a base portion having a finite thickness and opposed substantially parallel surfaces, a plurality of through holes formed in said base portion and protrusions extending outwardly from said opposed surfaces of said base portion.

28. A filter as set forth in claim 20 including a plurality of refractory screen prefilters located adjacent to said inlet surface of said inlet portion, whereby a tortuous path is created for liquid flowing through said plurality of refractory screen prefilters.

29. A filter having a reticulated ceramic inlet portion, a reticulated ceramic intermediate body portion contiguous with said inlet portion and a reticulated ceramic outlet portion contiguous with said intermediate body portion; said outlet portion having an outlet surface; said inlet portion having an inlet surface formed with a plurality of spaced openings, a blind hole extending away from each of said openings toward said outlet surface, each of said blind holes having a continuous longitudinal side wall and an end wall spaced from said inlet surface, whereby said openings and said end walls of said blind holes provide a substantial contact area for liquids supplied to said inlet surface to increase the filtration capacity of said filter and the rate of flow of liquid passing through said filter.

30. A filter as set forth in claim 29 wherein each of said inlet portion, said intermediate body portion and said outlet portion has a different porosity.

31. A filter as set forth in claim 29 wherein each of said blind holes has a cylindrical cross section.

32. A filter as set forth in claim 30 wherein said porosity is progressively greater between said inlet surface and said outlet surface.

33. A filter as set forth in claim 29 including a refractory screen prefilter located adjacent to said inlet surface of said inlet portion to remove solid inclusions from liquids passing through said refractory screen prefilter to decrease clogging of said inlet portion and said intermediate body portion.

34. A filter as set forth in claim 33 wherein said refractory screen prefilter is sintered to said inlet surface of said inlet portion.

35. A filter as set forth in claim 34 wherein said refractory screen prefilter is formed with a plurality of substantially rectangular shaped openings.

36. A filter as set forth in claim 35 wherein said refractory screen prefilter is sintered to said upper surfaces of said raised peaks on said inlet surface.

37. A filter as set forth in claim 33 wherein said refractory screen prefilter has a base portion having a finite thickness and opposed substantially parallel surfaces, a plurality of through holes formed in said base portion and protrusions extending outwardly from said opposed surfaces of said base portion.

38. A filter as set forth in claim 37 wherein each of said protrusions is located between through openings in said base portion and each of said protrusions has a distal surface.

39. A filter as set forth in claim 37 wherein said distal surfaces of said protrusions are sintered to said inlet surface of said inlet portion.

40. A filter as set forth in claim 32 including a plurality of refractory screen prefilters located adjacent to said inlet surface of said inlet portion, whereby a tortuous path is created for liquid flowing through said plurality of refractory screen prefilters.

41. A filter as set forth in claim 29 including an impervious ceramic coating on the end wall of each of said blind holes to divert the direction of flow of liquid flowing into each of said blind holes into a different direction of flow, whereby said coated end walls of said blind holes form a tortuous flow path for a liquid supplied to said inlet surface and said side walls of said blind holes provide a substantial contact area for liquid supplied to said inlet surface to increase the filtration capacity of said filter and the rate of flow of liquid passing through said filter.

42. A filter as set forth in claim 41 wherein each of said inlet portion, said intermediate body portion and said outlet portion has a different porosity.

43. A filter as set forth in claim 42 wherein said porosity is progressively greater between said inlet surface and said outlet surface.

44. A filter as set forth in claim 29 including an impervious ceramic coating on said inlet surface adjacent to said openings in said inlet surface to prevent liquid from passing directly to said inlet portion, whereby liquid flows through said openings into said blind holes.

45. A filter as set forth in claim 41 including a refractory screen prefilter adjacent to said inlet surface of said inlet portion.

46. A filter as set forth in claim 45 wherein said refractory screen prefilter has a base portion having a finite thickness and opposed substantially parallel surfaces, a plurality of through holes formed in said base portion and protrusions extending outwardly from said opposed surfaces of said base portion.

47. A filter as set forth in claim 45 including a plurality of refractory screen prefilters located adjacent to said inlet surface of said inlet portion, whereby a tortuous path is created for liquid flowing through said plurality of refractory screen prefilters.

48. A filter as set forth in claim 44 wherein each of said inlet portion, said intermediate body portion and said outlet portion has a different porosity.

49. A filter as set forth in claim 48 wherein said porosity is progressively greater between said inlet surface and said outlet surface.

50. A filter having a reticulated ceramic inlet portion, a reticulated ceramic intermediate body portion, and a reticulated ceramic outlet portion; said inlet portion having a non-planar inlet surface formed with a plurality of depressions; and said outlet portion having an outlet surface spaced from said inlet portion, whereby said depressions of said non-planar inlet surface provide a substantial contact area for liquids supplied to said inlet surface of said inlet portion of said filter to increase the filtration capacity of said filter and the rate of flow of liquid passing through said inlet portion, said intermediate body portion and said outlet portion to said outlet surface.

51. A filter as set forth in claim 50 wherein each of said inlet portion, said intermediate body portion and said outlet portion has a different porosity.

52. A filter as set forth in claim 51 wherein said porosity is progressively greater between said inlet surface and said outlet surface.

* * * * *